Sept. 14, 1965  R. N. LEVAKE  3,206,171
MIXING AND DISCHARGE APPARATUS
Filed May 29, 1963  2 Sheets-Sheet 1
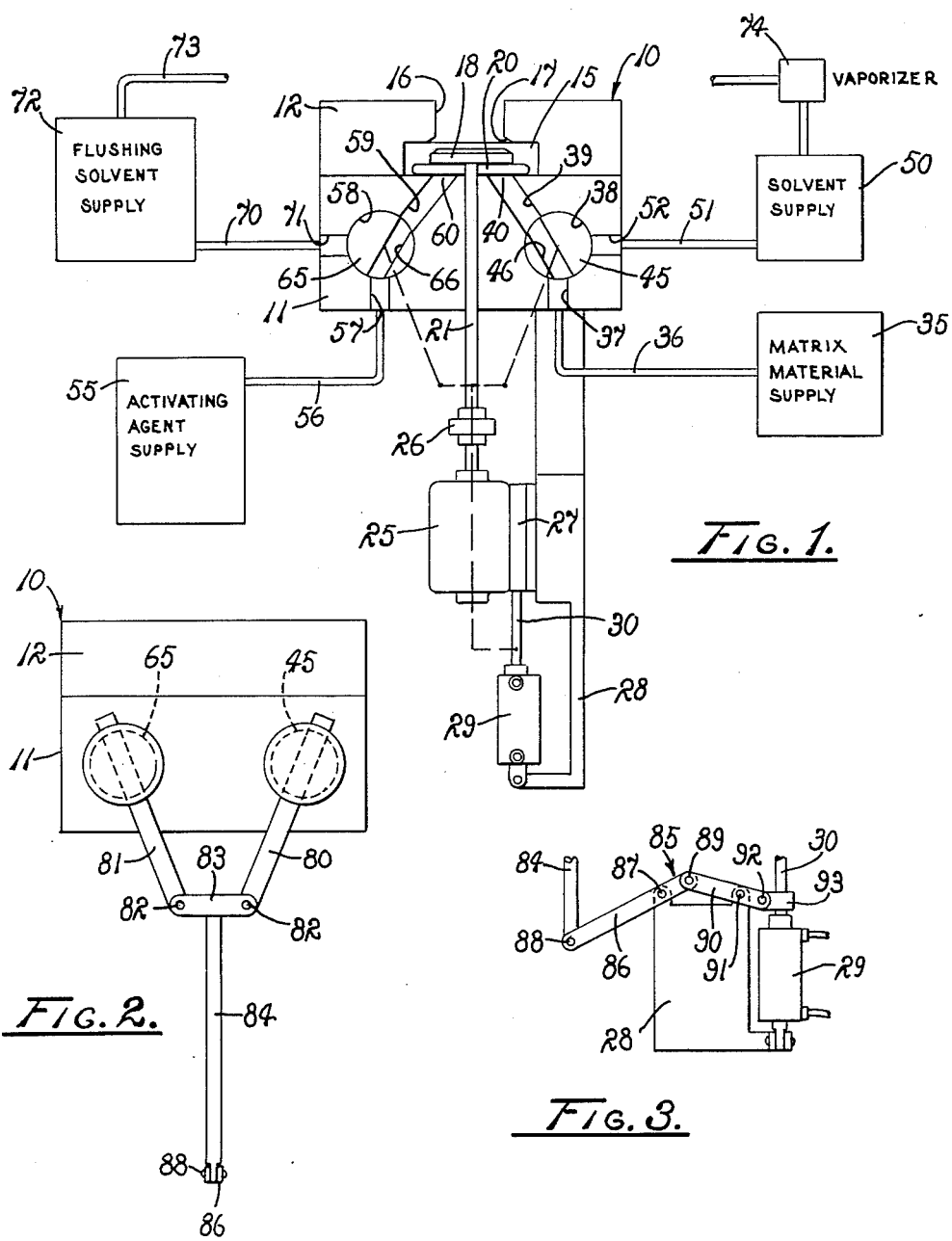
RICHARD N. LEVAKE
INVENTOR
BY Lyon Lyon
ATTORNEYS

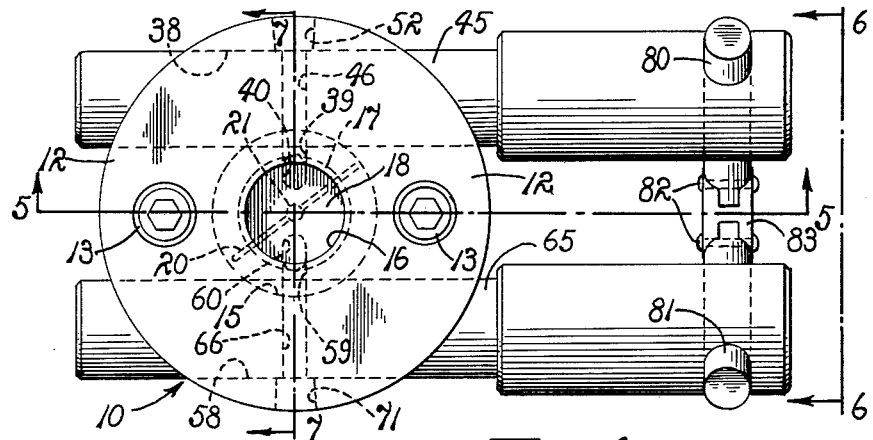
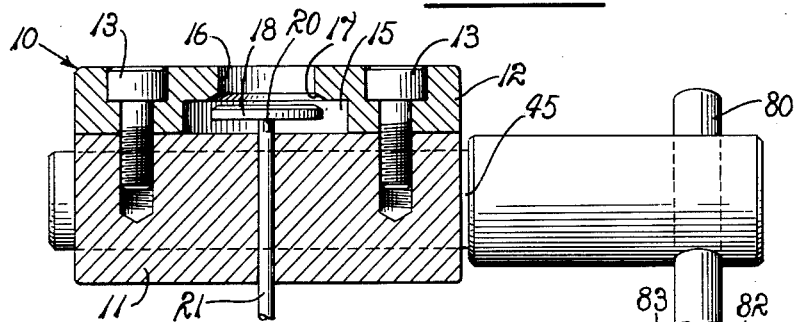
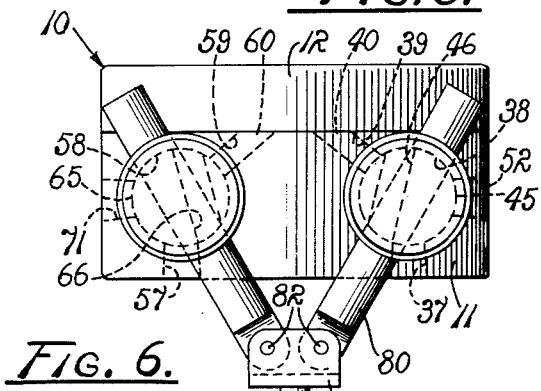
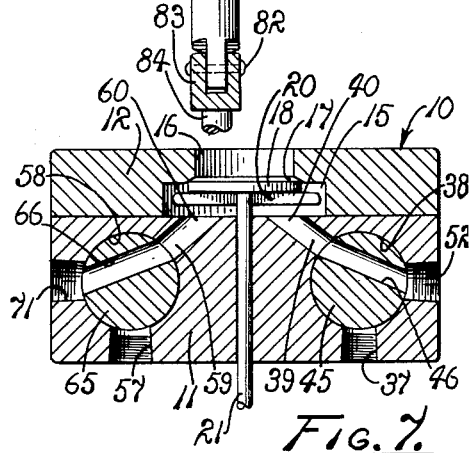
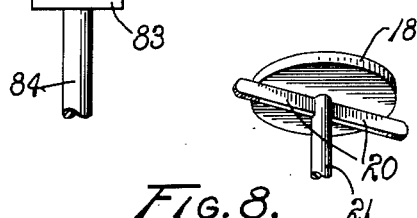
RICHARD N. LEVAKE
INVENTOR
ATTORNEYS United States Patent Office 3,206,171
Patented Sept. 14, 1965

3,206,171
MIXING AND DISCHARGE APPARATUS
Richard N. Levake, Phoenix, Ariz., assignor to Plastic Materials, Inc., Fresno, Calif., a corporation of California
Filed May 29, 1963, Ser. No. 284,101
11 Claims. (Cl. 259—8)

This invention relates to a mixing and discharging apparatus adapted for cyclic mixing and discharging of a matrix material and activating agent therefor and also for quick-flushing of the apparatus following mixing and discharging operations so as to remove any residue of the mixture of the matrix and activating agent. The invention particularly relates to such apparatus adapted to mix a thermosetting resin with an activating agent to form a quick-curing mixture of short pot-life, to discharge the resulting mixture, and to flush the apparatus with a suitable solvent following the mixing and discharging cycle.

A universal problem exists in connection with apparatus adapted to mix and discharge a thermosetting resin with a suitable accelerator wherein the mixing and discharge operations are not continuous and varying periods of non-use follow cycles of mixing and discharging operations. In such operational procedures, many operators resort to as near a continuous operation as possible to prevent the mixture from curing and hardening within the apparatus. Such an operation is usually wasteful and uneconomic since the constituent materials are sometimes discharged unnecessarily. As an alternative procedure, the apparatus is operated cyclically and must be extensively and thoroughly cleaned of all residual portions of the mixture of resin and accelerator after each cycle of mixing and discharging. This cleaning is required so that the apparatus can function properly during successive mixing and discharging cycles. Such cleansing operations are time consuming, tedious, require an excessive amount of solvent material and represent an increased cost of the finished product.

Accordingly, it is an object of the present invention to provide an improved mixing and discharging apparatus of the character described.

Another object is to provide more efficient apparatus to mix a matrix material and activating agent therefor and to discharge the resulting mixture during selective aperiodic cycles.

Another object is to provide a mixing and discharging apparatus for a matrix material and activating agent therefor and including means for quickly flushing the apparatus following mixing and discharging operations.

Another object is to provide apparatus suited for selective aperiodic cyclic mixing and discharging operations and including a solvent flushing system adapted for efficient cleansing of the apparatus following each cycle of mixing and discharging.

Another object is to provide apparatus adapted to mix a thermosetting resin and activating agent therefor, and to discharge the resulting mixture which minimizes materials lost during cleansing of the apparatus.

A further object of the invention is to provide a mixing and discharging apparatus for thermosetting resins and the like which is efficient in operation and economic in the utilization of such resins.

These, together with other objects, will become more fully apparent upon reference to the following description and accompanying drawings.

In the drawings:

FIG. 1 is a schematic illustration of mixing and discharging apparatus embodying the principles of the present invention, portions of the apparatus being shown in longitudinal horizontal section.

FIG. 2 is a fragmentary top plan view illustrating a portion of the valve control linkage employed in the apparatus of FIG. 1.

FIG. 3 is a fragmentary view of the apparatus of FIG. 1 showing another portion of the valve control linkage employed therein.

FIG. 4 is an enlarged fragmentary view in front elevation showing a portion of the mixing and discharging apparatus of FIG. 1.

FIG. 5 is a view of the apparatus in longitudinal section taken on line 5—5 of FIG. 4, and showing the apparatus in a condition for discharging material.

FIG. 6 is a top plan view taken from a position indicated by the line 6—6 in FIG. 4, and showing the valves of the apparatus in a flow blocking position.

FIG. 7 is a view in transverse section taken on line 7—7 of FIG. 4, and showing the valves in a position to permit flushing of the apparatus.

FIG. 8 is a fragmentary perspective view showing a mixing rotor and valve head of the structure shown in FIG. 4.

Referring in greater particularity to the drawings, the mixing and discharging apparatus of the present invention includes a mixing housing, generally indicated at 10, and having a valve body 11 to which is attached a cover 12 by suitable means, such as capscrews 13, as shown in FIG. 5. A mixing chamber 15 is provided in the cover 12, and in a commercial embodiment of the invention, the mixing chamber is cylindrical in form and is in communication with a circular discharge opening 16 provided in the cover 12. An inwardly facing valve seat 17 circumscribes the discharge opening and is adapted to be engaged by a circular discharge valve head 18. The discharge valve is adapted for movement between an open position, as shown in FIGS. 1 and 5, and a closed position, as shown in FIG. 7.

A mixing rotor 20 is disposed in the chamber 15 and includes a diametrically extended blade of a length substantially coextensive with the diameter of chamber 15. The discharge valve 18 is carried by the rotor 20 and can be fabricated integrally therewith. The rotor is rigidly secured to a longitudinally extended drive shaft 21 which is rotatably and longitudinally slidably mounted in the housing 10. A rotary drive motor schematically illustrated at 25 is connected in driving relationship to the shaft 21 by a coupling 26. The drive motor 25 is adapted for movement toward and away from the housing 10 by reason of being longitudinally slidably supported on a slideway 27 formed in a supporting frame 28 rigidly secured to the housing 10. The supporting frame 28 is preferably formed to adapt the housing 10, motor 25, and associated components for portable operation, thereby permitting a maximum flexibility in the utility of the device. To facilitate such portability, all of the components are preferably made of lightweight material and of compact size. To effect reciprocation of the shaft 21 and movement of the discharge valve 18 between open and closed positions, a reciprocating motor 29 is rigidly connected to the shaft 21 through coupling 26 and motor 25 by means of a connecting rod, indicated at 30.

A matrix material supply reservoir, schematically illustrated at 35, is provided with a supply tube 36 leading to the housing 10. To permit ease of operation, a commercial embodiment of the invention incorporates a supply tube 36 in the form of a flexible hose. The housing 10 is provided with a passageway 37 in fluid communication with a valve chamber 38 formed in the housing and a passageway 39 terminating in an entry port 40 in communication with mixing chamber 15. The supply tube 36 is secured to the housing to provide communication with the mixing chamber 15 through passageway 37, valve chamber 38, and supply passage 39. Such connection between the mixing chamber 15 and matrix material supply reservoir 35 constitutes supply conduit means for the matrix material.

A cylindrical flow control valve member 45 is rotatably mounted in the valve chamber 38 and provided with a passageway 46 adapted to establish communication between the matrix material supply 35 and the mixing chamber 15. The valve 45, being rotatably mounted in the housing, is selectively shiftable alternatively to and from the open position shown in FIG. 1 to a closed position shown in FIG. 7 to admit and to block flow of fluid through the supply conduit means leading from the matrix material supply 35 to the mixing chamber 15.

A solvent supply reservoir is illustrated at 50 and is provided with a flexible supply tube 51 leading therefrom to a passageway 52 provided in the housing 10. Upon appropriate positioning of the valve 45, the solvent supply reservoir 50 is placed in communication with the mixing chamber 15 through tube 51, passageway 46 extending through chamber 38, and supply passageway 39. This condition of valve 45 is illustrated in FIG. 7 and the passageways thereby placed in fluid communication in conjunction with the tube 51 constitute conduit means leading from the solvent supply reservoir 50 to the mixing chamber 15.

An activating agent supply reservoir is illustrated at 55. In a manner substantially identical to that of matrix supply 35, the activating agent supply 55 is provided with a flexible supply tube 56 leading to a passageway 57 formed in housing 10 and communicating with a valve chamber 58 and a supply passageway 59 terminating in an entry port 60 leading to mixing chamber 15. Accordingly, conduit means are thereby provided leading from the activating agent supply 55 to the mixing chamber 15.

To provide selective control of the flow of activating agent to the mixing chamber 15, a cylindrical control valve 65 having a passageway 66 extended therethrough is rotatably mounted in the valve chamber 58, in a manner substantially identical to the mounting of valve 45. The valve 65 is also shiftable alternatively to and from the open position shown in FIG. 1 and to a closed position shown in FIG. 7 thereby to admit and to block flow of fluid from the activating agent supply to mixing chamber 15.

A flushing vent conduit 70 is secured to the housing 10 in fluid communication with a vent passageway 71 provided therein. To prevent loss of solvent flowing through the mixing chamber 15 upon appropriate positioning of the valves 45 and 65, as shown in FIG. 7, a flushing solvent receptacle 72 is provided in fluid communication with the vent conduit 70. To minimize the quantity of solvent required, a closed circuit between the solvent supply 50 and the vent conduit 70 is provided by a return tube 73 interconnecting the vent conduit 70 and the supply 50. In FIG. 1, this interconnection includes the receptacle 72, which can be considered a portion of the return line, and also includes a separator, schematically illustrated at 74. The details of the separator are not shown, but can be of any form familiar to those skilled in the art and adapted to remove foreign matter from the solvent.

In a commercial embodiment of the invention, the matrix material consists of a thermosetting polyester resin and the activating agent is a suitable peroxide accelerator. Other matrix materials, such as polyurethane resins and the like will readily occur to those skilled in the art as being suited for use in the apparatus.

Referring to FIGS. 1, 2 and 3, suitable linkage to effect synchronized movement of the control valves 45 and 65 includes individual control rods 80 and 81 individually slidably carried in a respective one of the valves 45 and 65. The control rods are interconnected by means of respective pivot pins 82 carried in a synchronizing bar 83. An actuating rod 84 is extended from the bar 83 and operatively connected to a mechanical movement amplifying linkage, generally indicated at 85. The linkage 85 includes a first mechanical advantage lever 86 provided with a fulcrum on the support frame 28 by a pivot pin 87 and pivotally connected at one end to the actuating rod 84 by means of a pin 88. The other end of lever 86 carries a pivot pin 89 which interconnects the first lever with a second mechanical advantage lever 90. The second lever is pivotally mounted on the support frame 28 by a pin 91 and operatively connected by a pivot pin 92 to a collar 93. The collar 93 is rigidly connected to the connecting rod 30 and, upon reciprocation of the motor 29, is actuated in a longitudinally directed motion with connecting rod 30.

*Operation*

The operation of the described embodiment of the subject invention is believed to be readily apparent and is briefly summarized at this point. Assuming that it is desired to mix the matrix material with the activating agent and to discharge the resulting mixture through the opening 16, the reciprocating motor 29 is actuated to position the flow control valves 45 and 65 to the respective positions shown in FIG. 1. Simultaneously, the discharge valve 18 is moved to the open position as shown by reason of connecting rod 30, motor 25, coupling 26 and shaft 21. In view of the fact that there is a great disparity between the range of movement required to move valve 18 from a closed position to an open position as compared to the range of movement required to effect positioning the valves 45 and 65, the amplifier linkage 85 provided on the support frame 28 insures proper synchronized movement of sufficient amplitude to effect movement of the flow control valves 45 and 65 to the respective positions shown. At the same time, the rotary drive motor 25 is actuated to effect rotation of shaft 21 and mixing rotor 20. Thus, it can be seen that a supply of matrix material flows through the tube 36 and thence to the mixing chamber 15 to be mixed intimately with an activating agent supplied from the reservoir 55 through tube 56.

Further, assuming that the mixing and discharging operation is to be performed in a periodic or aperiodic cyclic manner, the reciprocating motor 29 is actuated to effect shifting of the flow control valves 45 and 65 from the position shown in FIG. 1 to the position shown in FIG. 7. In the position shown in FIG. 7, solvent from the supply reservoir 50 is permitted to flow through tube 51, passageway 52, passageway 46, and supply passageway 39 into the mixing chamber 50. During this flushing cycle, the drive motor 25 is preferably continued in operation to insure removal of the residual material from the rotor 20 and around the periphery of the valve head 18.

To prevent unnecessary escape of the solvent from the discharge opening 16, the flow control valve linkage which includes actuating rod 84 and amplifying linkage 85 is operatively connected with shaft 21 through connecting rod 30. Accordingly, upon positioning of the valve 45 to the flushing position shown in FIG. 7, the shaft 21 is effective to move the valve 18 into engagement with the valve seat 17 thereby blocking flow through discharge opening 16.

It is also to be noted that flow control valve 65 is positioned to establish communication between the mixing chamber 15 and the flushing vent conduit 70. Consequently, solvent flow through the mixing chamber 15 is vented overboard through conduit 70. The salvage solvent flow through the chamber and carrying residual particles of matrix material and activating agent as well as the resulting mixture, the vent conduit 70 is connected to the flushing solvent receptacle 72. A more economical arrangement is provided by reason of the return flow tube 73 connecting the vent conduit 70 and the solvent supply reservoir 50 through the receptacle 72. With such a closed circuit for the flushing solvent, the receptacle can optionally be removed from the circuit. In addition to the closed circuit, the separator 74 can effect a further economy in the operation by separating foreign matter from the solvent, thereby minimizing flushing time and decreasing the required quantity of solvent.

When it is desired to suspend operations for a temporary period, the motor 29 is actuated to position the flow control valves 45 and 65 to block flow of fluid from the supply reservoirs respectively in communication with the valves. Such a position is shown in FIG. 6 wherein the passageways 46 and 66 are shown in dotted lines. The valves are positioned by actuation of the reciprocating motor 29 through a range of movement toward a mixing and discharge position of the valves, the movement being selectively limited so as to block flow of material through the ports, also shown in dotted lines in FIG. 6. With the valves 45 and 65 in the respective positions shown, communication between all of the sources of supply and the mixing chamber is effectively blocked.

Accordingly, an improved apparatus is provided by the present invention to effect an efficient mixing of a matrix material and activating agent therefor and to discharge the resulting mixture. The apparatus permits selective cyclic operation and thorough cleaning of the mixing chamber following periods of mixing and discharging. With the apparatus of the present invention, an operating efficiency is achieved which was not permitted by devices heretofore available. Also, an economy of materials is effected which materially reduces the cost of articles produced by resin mixing and extruding apparatus.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mixing and discharging apparatus adapted for quick-flushing comprising a housing provided with a mixing chamber and a discharge opening leading therefrom; separate sources of supply respectively for a matrix material and an activating agent; separate supply conduit means leading from each of said sources of supply to said mixing chamber to admit thereto in discrete proportions said matrix material and activating agent; a pair of flow control valves, each being provided in a respective one of said supply conduit means and shiftable alternatively to and from open and closed positions to admit and to block flow of fluid therethrough; a separate source of solvent for said matrix material, the solvent being effective in use also for a mixture of said matrix and said activating agent; and conduit means leading from said solvent source to said mixing chamber and in fluid communication with one of said flow control valves, said one valve being shiftable to a first position to block fluid flow through both of the conduits in fluid communication therewith, and to a second position establishing communication between its respective one of said supply sources while blocking flow between said solvent source and said mixing chamber, and also to a third position blocking flow from said respective one of said supply sources while admitting flow from said solvent source to said mixing chamber.

2. A mixing and discharging apparatus, adapted for quick-flushing, comprising a housing provided with a mixing chamber and a discharge opening leading from the chamber; separate sources of supply respectively for a matrix material and an activating agent for the matrix material; separate supply conduit means leading from each of said sources of supply to said mixing chamber to admit thereto in discrete proportions said matrix material and activating agent; mechanical mixing means disposed in said chamber; power means operably connected to said mixing means in driving relationship; a pair of flow control valves, each being provided in a respective one of said supply conduit means and shiftable alternatively to and from open and closed positions to admit and to block flow of fluid therethrough; a separate source of solvent for said matrix material, the solvent being effective in use also for a mixture of said matrix and said activating agent; and conduit means leading from said solvent source to said mixing chamber and in fluid communication with one of said flow control valves, said one valve being shiftable to a first position to block fluid flow through both of the conduits in fluid communication therewith, to a second position establishing communication between its respective one of said supply sources while blocking flow between said solvent source and said mixing chamber, and to a third position blocking flow from said respective one of said supply sources while admitting flow from said solvent source to said mixing chamber.

3. The mixing and discharging apparatus of claim 2 wherein said mechanical mixing means comprises a rotor disposed in said chamber and includes a drive shaft projecting from said rotor and rotatably mounted in the housing, and wherein said power means is operably connected to said shaft in a driving relationship.

4. A mixing and discharging apparatus, adapted for quick-flushing, comprising a housing provided with a mixing chamber and a discharge opening leading from the opening; separate sources of supply respectively for a matrix material and an activating agent for the material; separate supply conduit means leading from each of said sources of supply to said mixing chamber to admit thereto in discrete proportions said matrix material and activating agent; a pair of flow control valves each provided in a respective one of said supply conduit means and shiftable alternatively to and from open and closed positions to admit and to block flow of fluid therethrough; a separate source of solvent for said matrix material, the solvent being effective in use also for a mixture of said matrix and said activating agent; conduit means leading from said solvent source to said mixing chamber and in fluid communication with one of said flow control valves, said one valve being shiftable to a first position to block fluid flow through both of the conduits in fluid communication therewith, to a second position establishing communication between its respective one of said supply sources while blocking flow between said solvent source and said mixing chamber, and to a third position blocking flow from said respective one of said supply sources while admitting flow from said solvent source to said mixing chamber; discharge valve means carried by said housing and adapted to close said discharge opening upon admission of said solvent to said mixing chamber; and a flushing vent conduit leading from said other valve and in fluid communication with said mixing chamber through said valve.

5. The mixing and discharge apparatus of claim 4 wherein a solvent salvage reservoir is provided in fluid communication with said fluid vent conduit to recover solvent passing through the mixing chamber.

6. The mixing and discharging apparatus of claim 5 wherein conduit means are connected between said vent conduit and said solvent supply thereby to provide a closed circuit for said solvent upon closing said discharge valve and appropriate positioning of said flow control valves to establish flow of solvent through said mixing chamber.

7. The mixing and discharging apparatus of claim 4 wherein said flushing vent conduit is in fluid communication with said solvent supply to return solvent from the mixing chamber, and wherein separator means is provided in said vent conduit to remove foreign matter from the solvent.

8. An apparatus, adapted for cyclic mixing and discharging of a matrix material in an activating agent and for quick flushing between discharging and mixing cycles, comprising a housing provided with a mixing chamber and a discharge opening leading from the chamber; a valve seat carried by the housing in circumscribing relation to said discharge opening; a mechanical mixing rotor disposed in said chamber; a discharge valve carried by said rotor and adapted to engage said valve seat and to close said discharge opening; a drive shaft rotatably and longitudinally slidably mounted in said housing and drivingly connected to said rotor; power means operatively connected to said shaft to effect longitudinal reciprocation thereof to move said valve between open and closed positions respectively away from and in sealing engagement with said valve seat; separate sources of supply respectively for a matrix material and an activating agent for the material; separate supply conduit means leading from each of said sources of supply to said mixing chamber to admit thereto in discrete proportions said matrix material and activating agent; a pair of flow control valves each provided in a respective one of said supply conduit means and shiftable alternatively to and from open and closed positions to admit and to block flow of fluid therethrough; a separate source of solvent for said matrix material, the solvent being effective in use also for a mixture of said matrix and said activating agent; conduit means leading from said solvent source to said mixing chamber and in fluid communication with one of said flow control valves, said one valve being shiftable to a first position to block fluid flow through both of the conduits in fluid communication therewith, to a second position establishing communication between its respective one of said supply source while blocking flow between said solvent source and said mixing chamber, and to a third position blocking flow from said respective one of said supply sources while admitting flow from said solvent source to said mixing chamber; and a flushing vent conduit leading from the other of said flow control valves, said other flow control valve being shiftable to a first position to block fluid flow through both of the conduits in fluid communication therewith, to a second position establishing communication between the activating agent source of supply while blocking communication with said flushing vent conduit and said mixing chamber, and to a third position blocking flow from said activating agent source of supply while admitting flow of solvent from said mixing chamber to said flushing vent conduit.

9. An apparatus, adapted for cyclic mixing and discharging of a matrix material and an activating agent and for quick flushing between discharging and mixing cycles, comprising a housing provided with a mixing chamber therein and a discharge opening leading therefrom; a valve seat carried by the housing in circumscribing relation to said discharge opening; a mechanical mixing rotor disposed in said chamber; a discharge valve carried by said rotor and adapted to engage said valve seat and to close said discharge opening; a drive shaft rotatably and longitudinally slidably mounted in said housing and connected to said rotor in driving relation thereto; power means operatively connected to said shaft to effect longitudinal reciprocation thereof to move said valve between open and closed positions respectively away from and in sealing engagement with said valve seat; separate sources of supply respectively for a matrix material and an activating agent for the material; separate supply conduit means leading from each of said sources of supply to said mixing chamber to admit thereto in discrete proportions said matrix material and activating agent; a pair of flow control valves, each being provided in a respective one of said supply conduit means and shiftable alternatively to and from open and closed positions to admit and to block flow of fluid therethrough; a separate source of solvent for said matrix material, the solvent being effective in use also for a mixture of said matrix and said activating agent; conduit means leading from said solvent source to said mixing chamber and in fluid communication with one of said flow control valves, said one valve being shiftable to a first position to block fluid flow through both of the conduits in fluid communication therewith, to a second position establishing communication between its respective one of said supply sources while blocking flow between said solvent source and said mixing chamber, and to a third position blocking flow from said respective one of said supply sources while admitting flow from said solvent source to said mixing chamber; a flushing vent conduit leading from the other of said flow control valves; said other flow control valve being shiftable to a first position to block fluid flow through both of the conduits in fluid communication therewith, to a second position establishing communication between the activating agent source of supply while blocking communication with said flushing vent conduit and said mixing chamber, and to a third position blocking flow from said activating agent source of supply while admitting flow of solvent from said mixing chamber to said flushing vent conduit; and linkage means operably interconnecting said reciprocating power means and said flow control valves to effect synchronized movement thereof simultaneously with said discharge valve.

10. The apparatus of claim 9 wherein return conduit means are provided interconnecting said vent conduit and said solvent supply to return solvent flowing through said mixing chamber.

11. The apparatus of claim 10 wherein a separator is provided in said return conduit to remove foreign matter from the solvent.

References Cited by the Examiner

UNITED STATES PATENTS

| | | | |
|---|---|---|---|
| 1,943,059 | 1/34 | Dana | 137—263 |
| 3,067,987 | 12/62 | Ballou et al. | 259—9 |

WALTER A. SCHEEL, *Primary Examiner.*

CHARLES A. WILLMUTH, *Examiner.*